R.H. Cole,
Imp.d Nut Machine,
No. 21551,   Patented Sept. 21 1858.
Fig: 3.
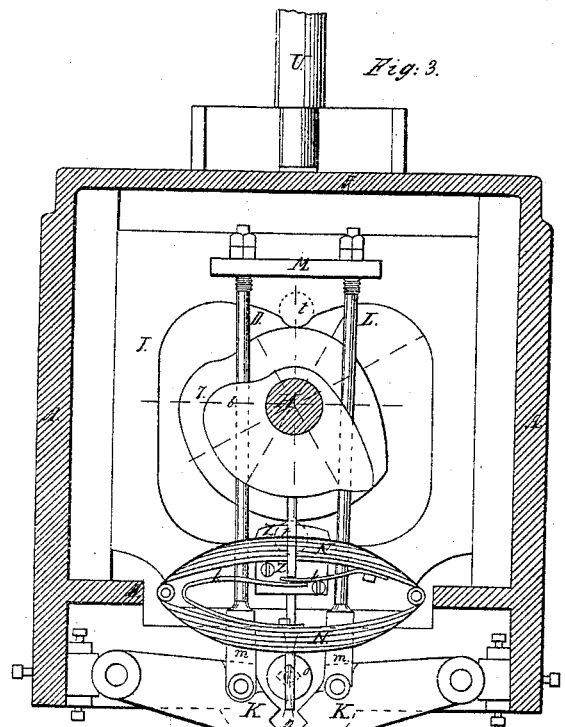
Fig: 4.
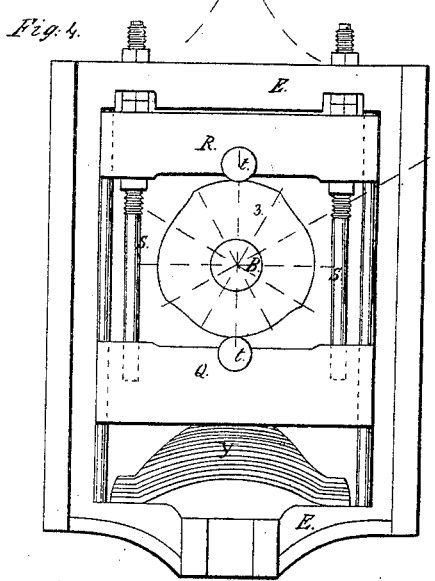
Witnesses.   Inventor.

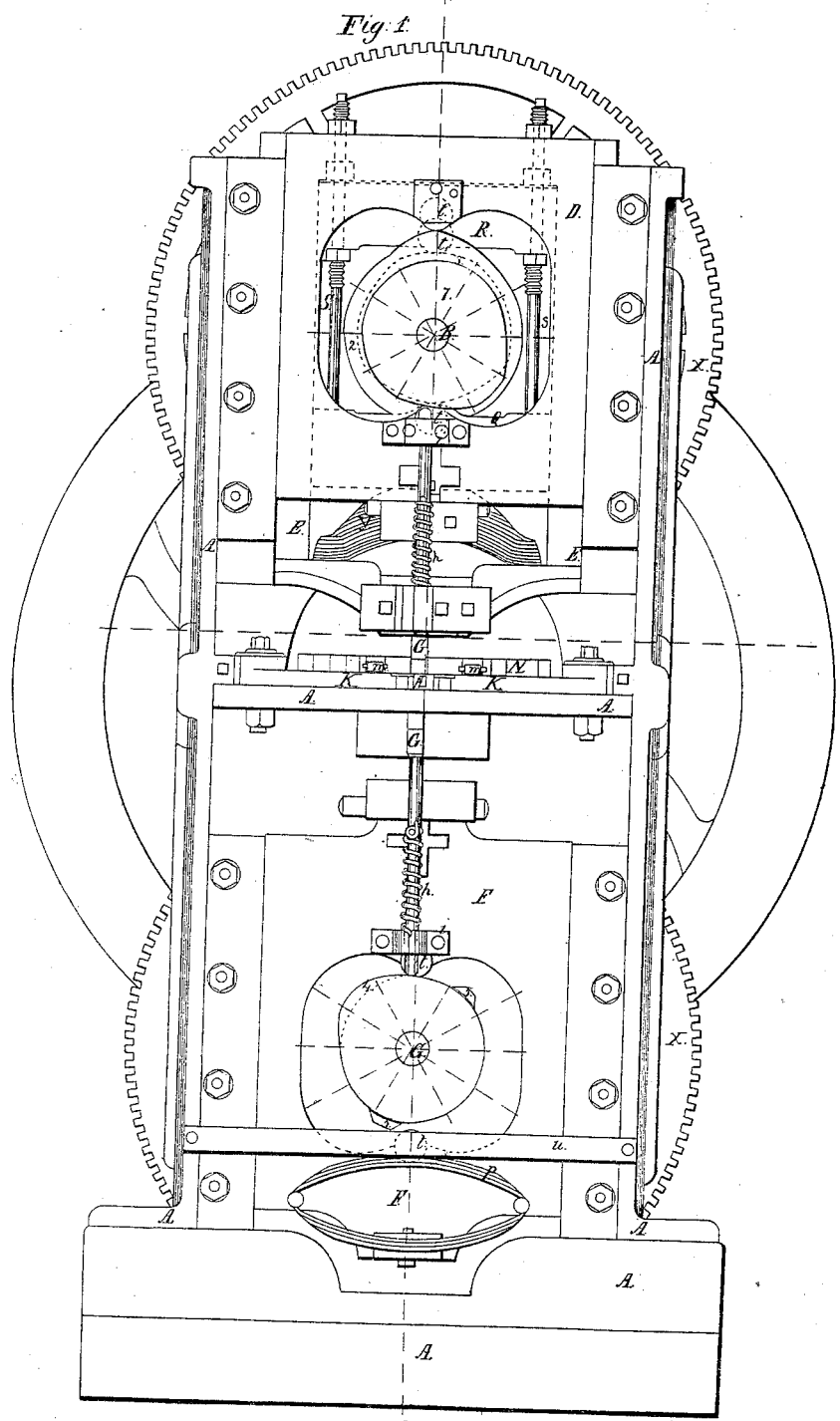

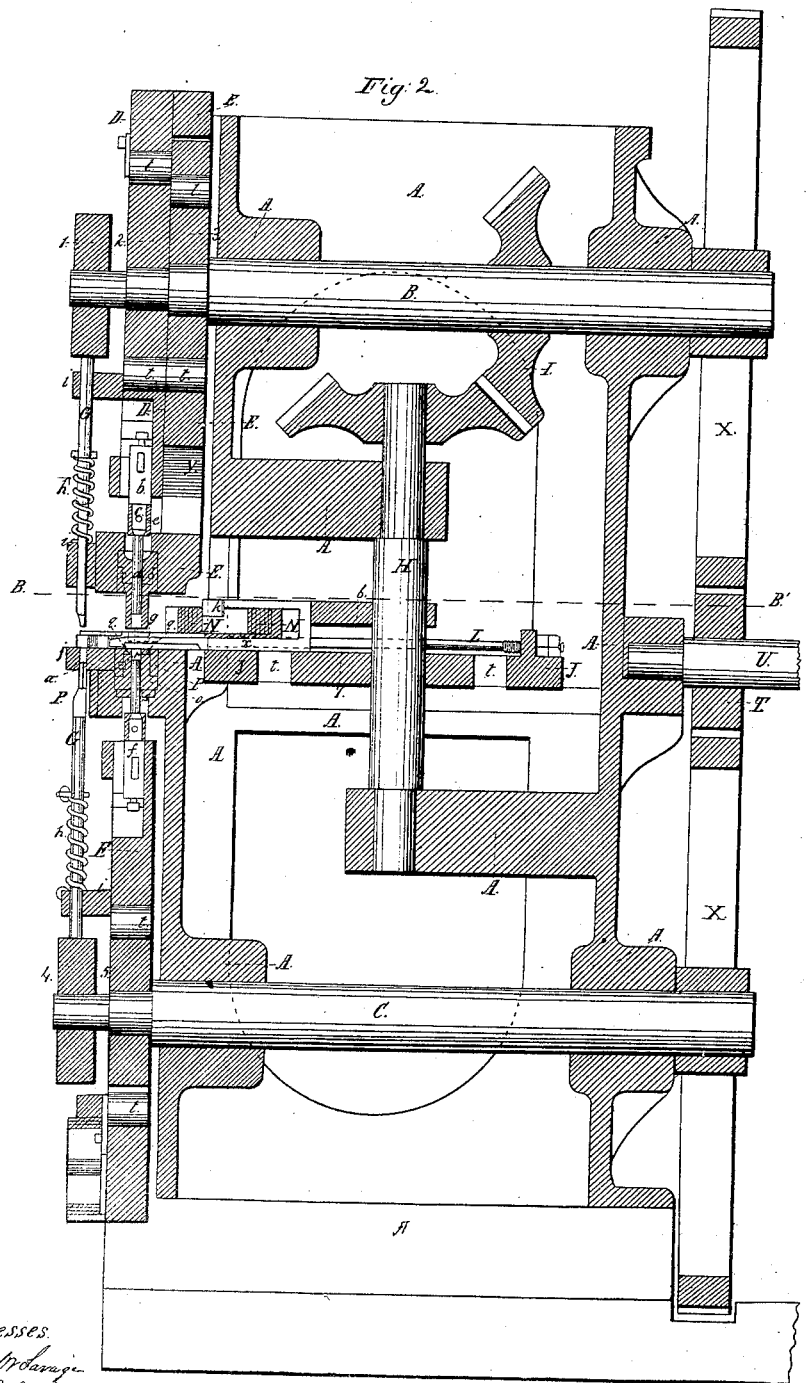

UNITED STATES PATENT OFFICE.

R. H. COLE, OF ST. LOUIS, MISSOURI.

NUT-MACHINE.

Specification of Letters Patent No. 21,551, dated September 21, 1858.

*To all whom it may concern:*

Be it known that I, RICHARD H. COLE, of the city of St. Louis and State of Missouri, have invented new and useful Improvements in Machines for Making Metallic Nuts; and I do hereby declare that the following is a full, clear, and exact description of the same, reference being had to the annexed drawing, making a part of this specification, in which—

Figure 1 is a front elevation; Fig. 2 a section through A′A′; Fig. 3 a horizontal section through B′ B′; Fig. 4 a part of the machine to be hereinafter explained.

Similar letters of reference represent corresponding parts on the different figures.

My invention consists in cutting the nut blank entirely off from the bar, with two knives, one of which is to act from each side of the said bar, so as to deposit the said blank between a pair of vibrating jaws or formers as hereinafter described, and of so arranging the said jaws or formers, as to cause them to press the sides of the nut blank to the required form while carrying it from the place where it is cut from the bar to where it is to be punched. And also in causing the jaws to be opened by a yielding force as hereinafter set forth. And also in a peculiar construction of the punches, and die, upon which the nut is punched, whereby an economy in material is effected as hereafter set forth.

A A A A, &c., is the frame of the machine.

B is a cam shaft on which there are three cams fixed as shown at 1, 2, 3, the cam 3 being shown in dotted lines in Fig. 1. C is also a cam shaft and on it there are two cams placed as shown at 4 and 5. The cams on these two shafts act against each other, and have certain relative positions, with each other, when in operation; so as to cause the punches to advance and recede the required distances, and at the required times.

D and E are slides each of which receives a reciprocating motion from the cams 2 and 3 respectively. F is also a slide which receives a motion like that of the slides D and E from the cam 5.

In the slide E the spring Y is placed the foot of which bears against the slide, and the crown against a bearing piece, shown at Q. This bearing piece is a kind of slide and is acted upon and governed in its position by a second bearing piece shown at R, through the agency of the rods S S, which are secured to the main slide and also to the cross piece R, by means of jam nuts; whereby the slide may be raised or lowered, on the cam; and whereby the spring Y can be loaded, so that it will yield, only to such pressures, as may be required to effect the desired object. The arrangement is fully shown at Fig. 4.

In the frame, A at *a* the die, is placed on which the nut is punched, and pressed. The construction of this die is peculiar, it is composed of three separate parts which when keyed together form the die. The main part of the die is marked *o*, and is made in cylinder form, the lower end being the full size of the die seat, but the upper end is turned down so as to receive the small sleeve *p*, the upper end of which is made square on the outside, and conical in the inside, so as to receive the die plate, *q;* which is placed on the top end of the piece *o*, and is shaped so as to fit in the top of the sleeve *p*, where it is firmly held by the key *r*. Now it will be seen that when the die piece *q* is worn out, it will require but a small amount of material to supply its place with a new one, or when it gets so much worn as to be unfit for a small sized nut, it may be reamed out and used for a larger size, which is the object of constructing it in the manner described. After this die is keyed together and put in its place it rests on a key, shown at *s*, whereby it may be raised or lowered as the case may require.

In the end of the slide D a round punch is fixed, as shown at *b*. This punch is also made in three parts, the part *b* is made square with a round end *c* turned on it, and against this round end the punch *d* is placed, and the two parts of the punch are then held together by means of the sleeve *e*, which is passed over them and keyed, precisely as in the case of the die just described. The construction of the two being identical in every respect and for the same purpose, for when the punch is worn out nothing but the round part need be replaced. In the slide F a round punch is also fixed as shown at *f*. This punch is made the same as the punch *b*, in every particular and for the same reason. In the slide E a square punch is fixed as shown at *g* and through it the round part of the punch *b* is made to work. Its construction is the same as the round punches and is so to the same end, economy. This square punch is termed the pressure punch, and is designed to condense the iron and to make the form on the bottom of the nut. The object of placing the spring Y between this punch and the cam, is to allow it to yield, under great pressure, so that in case the bar of iron is too large, the punch will yield, and allow the cams, to pass their centers, without breaking the machine.

G G are two knives, or cutters, which sever the blank from the bar. The upper one, receives its motion from the cam marked 1, and the lower one, receives its motion from the cam marked 4. That is they are pressed forward, by the said cams, but they are brought back, by the action of the springs, h h, which are coiled around them as shown. The knives work through suitable guides, fixed on the slides, D and F, as shown at i i i, the upper end, of the lower one, works through a slot cut in a projection, of the frame shown at j.

H is a vertical cam shaft which receives its motion through the agency of a miter wheel, marked I placed on the shaft B. This wheel meshes in a corresponding wheel fixed on the end of the vertical shaft, and on this shaft two cams are placed, shown at 6 and 7.

J is a horizontal slide, which receives its motion from the cam marked 7. The object of this slide is to work the two vibrating dies, or formers, K K, which it does in the following manner. One end of the two connecting rods L L pass through a rib cast on the slide for that purpose and are secured against the back side of the said rib by means of jam nuts as shown at M. The other end of the said connecting rods, are connected to the two dies or formers respectively as shown. On the top of the connecting rods a spring is laid as shown at N. This spring is secured to a bracket shown at 2 which is bolted to the slide, and the other crown of the said spring, bears against studs, or pins, fixed in the connecting rods, as shown at m m.

Now it will be seen that when the slide moves back to close the formers its action on them is direct and rigid, but when it moves forward to open them, its action is indirect and yielding, because it then acts first against the spring, which in its turn acts on the rods, whereby the formers are opened. The object in placing this yielding medium between the dies, and slide, is to prevent the machine from breaking in case the dies get jammed.

After the nut has been formed and punched and the dies or formers opened to the position shown at Fig. 3 it is necessary to discharge the nut from between them, so as to allow them to receive the end of the bar from which a succeeding nut is to be made. This is done by means of a displacing rod shown at x, which is pressed forward by the cam, marked 6, and is brought back by the action of the springs k k. This displacing rod is shown at Figs. 2 and 3, and the springs k act against its upper or short end, and on its under side, a hook is made, which is designed to clear the "wad," from the die o that is punched out of the center of the nut, when it returns, to its backward position against the cam.

t t t t, &c., are antifriction rollers against which the cans are made to act.

P is a spring the bottom of which is secured to a projection cast on the slide F and the crown of it bears against the cross bar, u. The object of this spring is to draw the slide back, so as to keep the top roller constantly against the cam, so as to prevent thumping or noise when the machine is in operation.

X X are two spur wheels, fixed on the cam shafts B and C, and T is a pinion, fixed on the driving shaft U, which conveys motion to the two spur wheels.

Now let the machine be in motion and let the end of a bar of iron be introduced between the vibrating dies at j. The knives then commence to advance and cut off the blank which is to form the nut. The cam 7 then commences to close the dies and carry the blank over the center of the die o. The square punch then advances and compresses the nut and forms the bottom on it (it being made upside down). The two round punches then commence to advance; one from each side at the same time and with the same velocity; the lower punch advancing about half way through the nut where it is met by the upper one. It then recedes and the upper one continues to advance entirely through the nut; when it recedes the square punch then raises and leaves the nut finished. The vibrating dies then commence to open, and carry the nut forward, on the table, or projection j from whence it is displaced by the rod x, which is then acted upon by the cam 6. It will thus be seen that the two center, or round punches, acting as they do together, one from each side of the nut must press the center of the nut in the sides, leaving but a thin "wad" about as thick as a wafer. This thin wad it is necessary to discharge so as to leave the machine clear to receive a succeeding nut and it is to effect this object that the upper punch is made to go all the way through the nut, whereby the wad is pressed down into the lower die, and as soon as the displacing rod has moved forward to discharge the nut the lower punch is pressed up by a second projection on the cam 5, which throws the wad on the face of the die o, from whence it is removed by the backward movement of the displacing rod $x$ which has a hook on its bottom side, made by a recess cut for that purpose. By this arrangement of punches and cams a portion of the center or wad is forced in the body of the nut, whereby the nut is made thicker and more compact than the bar from which it is made. It is also shown that the nut is pressed under a yielding pressure punch so that all the nuts are made perfect even if one bar is a little thicker than the other. Neither of these arrangements however are new as they have all been patented to me by patents numbered, respectively, 13,252, 15,003, and 15004, to which I would respectfully refer for a more full account of the various arrangements herein referred to.

The objects sought after in this invention is to make the nut without a bur and to economize material in the construction of the punches and dies. When the blank is severed by cutting from one side of the bar and driven in a die box or otherwise, there will be a bur left on the top or bottom side, which must be afterward removed, and which involves the constant employment of one man to each machine. But by causing the knives to cut from each side of the bar at the same time, and then by moving the blank from where it is cut to where it is to be punched and pressed between a pair of vibrating dies or formers, on a flat surface, as is done in this machine, as has been described, the nut is made perfect without bur or defect of any kind.

What I claim as my invention, and desire to secure by Letters Patent, is—

1. The arrangement of the two knives G G, whereby they are made to act simultaneously—on each side of the bar—so as to cut the nut blank entirely off, and deposit it between the vibrating jaws or formers K, K, substantially as described.

2. And I also claim the arrangement of the vibrating dies or formers K K whereby they are made to press the sides of the nut to the required form—while carrying it from where it is cut off to where it is to be punched—on the die $o$, substantially in the manner set forth.

3. And I also claim the spring N, as arranged with the aforesaid jaws or formers, whereby they are opened by a yielding force as described.

4. I do not claim facing the dies or punches with steel—as they are both made entirely of that metal, but I claim making them in three separate pieces or parts substantially as described, so that I can renew one part and retain the other—so as to economize material.

R. H. COLE.

Witnesses:
   Thos. W. Savage,
   Jos. R. Dickson.